US005956955A

United States Patent [19]

Schmid

[11] Patent Number: 5,956,955

[45] Date of Patent: Sep. 28, 1999

[54] HEAT SHIELD FOR A GAS TURBINE COMBUSTION CHAMBER

[75] Inventor: Achim Schmid, Berlin, Germany

[73] Assignee: BMW Rolls-Royce GmbH, Munich, Germany

[21] Appl. No.: 08/776,615

[22] PCT Filed: Jul. 17, 1995

[86] PCT No.: PCT/EP95/02795

§ 371 Date: Feb. 3, 1997

§ 102(e) Date: Feb. 3, 1997

[87] PCT Pub. No.: WO96/04510

PCT Pub. Date: Feb. 15, 1996

[30] Foreign Application Priority Data

Aug. 1, 1994 [DE] Germany ............................ 44 27 222

[51] Int. Cl.$^{6}$ ........................................................ F02C 3/06

[52] U.S. Cl. ............................. 60/748; 60/39.36; 60/756

[58] Field of Search ................................... 60/748, 39.36, 60/752, 755, 756

[56] References Cited

U.S. PATENT DOCUMENTS

| | | |
|---|---|---|
| 2,616,257 | 11/1952 | Mock . |
| 5,129,231 | 7/1992 | Becker et al. . |
| 5,253,471 | 10/1993 | Richardson ............................ 67/39.36 |
| 5,307,637 | 5/1994 | Stickles et al. . |
| 5,419,115 | 5/1995 | Butler et al. . |
| 5,479,774 | 1/1996 | Burnell et al. ......................... 60/39.36 |
| 5,623,827 | 4/1997 | Monty ...................................... 60/748 |

FOREIGN PATENT DOCUMENTS

| | | |
|---|---|---|
| 0 509 176 | 10/1992 | European Pat. Off. . |
| 0 521 687 | 1/1993 | European Pat. Off. . |
| 30 09 908 | 9/1980 | Germany . |
| 2073401 | 10/1981 | United Kingdom . |

*Primary Examiner*—Charles G. Freay

*Attorney, Agent, or Firm*—Evenson, McKeown, Edwards & Lenahan, PLLC

[57] ABSTRACT

A heat shield for the head area of a combustion chamber has as usual a through-hole for the burner. A continuous collar with air passage holes projects from the back side of the heat shield at the edge of the through-hole. Cooling air can flow through the holes into a ring-shaped channel arranged between the heat shield and the burner, then into the combustion chamber. This cool air flow lies as a cool air film on the surface of the heat shield. For that purpose, the cool air flow or cool air film swirls in the same direction as the combustion air supplied through the burner. To generate this swirling motion, the air passage holes in the collar are inclined in the radial direction. The heat shield is further provided with appropriate inclined effusion holes.

12 Claims, 4 Drawing Sheets

HEAT SHIELD FOR A GAS TURBINE COMBUSTION CHAMBER

BACKGROUND AND SUMMARY OF THE INVENTION

This invention relates to a heat shield for a combustion chamber, particularly for an annular combustion chamber of a gas turbine, having a through-hole for a burner. The rearward side of the heat shield which faces away from the combustion chamber is acted upon by cooling air. The heat shield has a web extending around on the edge of the through-hole. Concerning the known state of the art, reference is made to U.S. Pat. No. 5,307,637 in which case the web is used for receiving or bearing the burner.

As known, the heat shield provided in the head of a combustion chamber is used for protecting the head area of the combustion chamber, which is constructed in the manner of a dome, or the front panel provided therein from the effect of the hot gas situated in the combustion chamber as well as from an excessive heat radiation. In order to be able to carry out this function, the heat shield itself must be cooled. For this purpose, conventional heat shields have so-called effusion holes in the surface facing the combustion chamber by way of which cooling air can flow through from the rearward side in order to place a cooling air film on the hot surface of the heat shield. This is explained in detail in U.S. Pat. No. 5,307,637. Another known heat shield arrangement is indicated in European Patent document EP-A-0 521 687, in which case air passage openings are provided in a web-type section, by which air passage openings cooling air can arrive in the combustion chamber.

However, since it is not always possible to sufficiently cool all endangered zones of the heat shield according to this known state of the art, the invention has the object of indicating further measures by which an improved heat shield cooling can be achieved.

The achieving of this object is characterized in that the web has a plurality of air passage holes which are inclined at an angle with respect to the direction pointing into the center of the through-hole such that an air flow entering through the air passage openings into a ring-shaped channel between the heat shield and the burner, and arriving from there in the combustion chamber, forms a swirl which has the same direction as the swirl which is formed by the combustion air supplied by way of the burner and which has a swirl axis extending perpendicularly to the surface of the heat shield. Advantageous embodiments and further developments are described herein.

The invention will be explained in detail by means of a preferred embodiment.

DETAILED DESCRIPTION OF THE DRAWINGS

Figure 3:
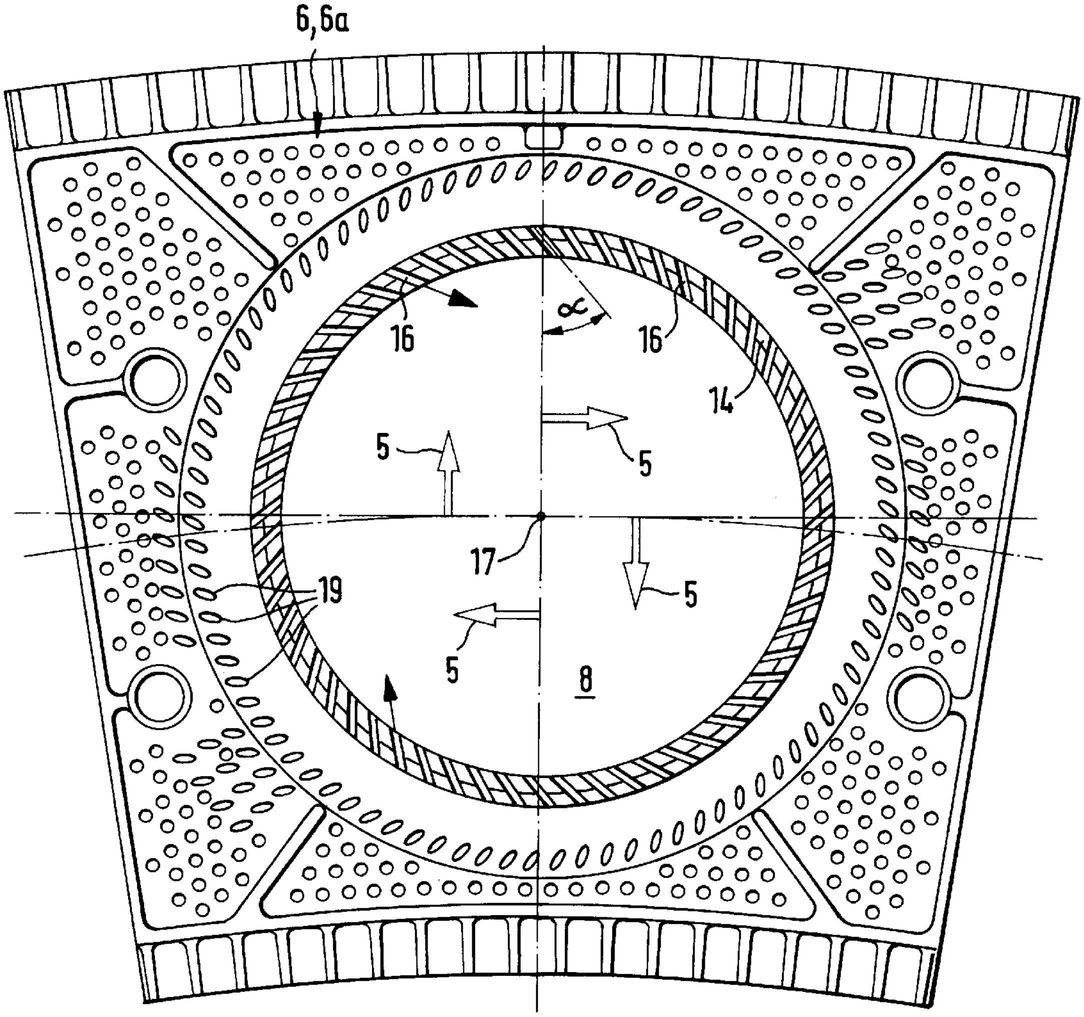
FIG. 3 is a top view of the cold rearward side of the heat shield.
Figure 4:
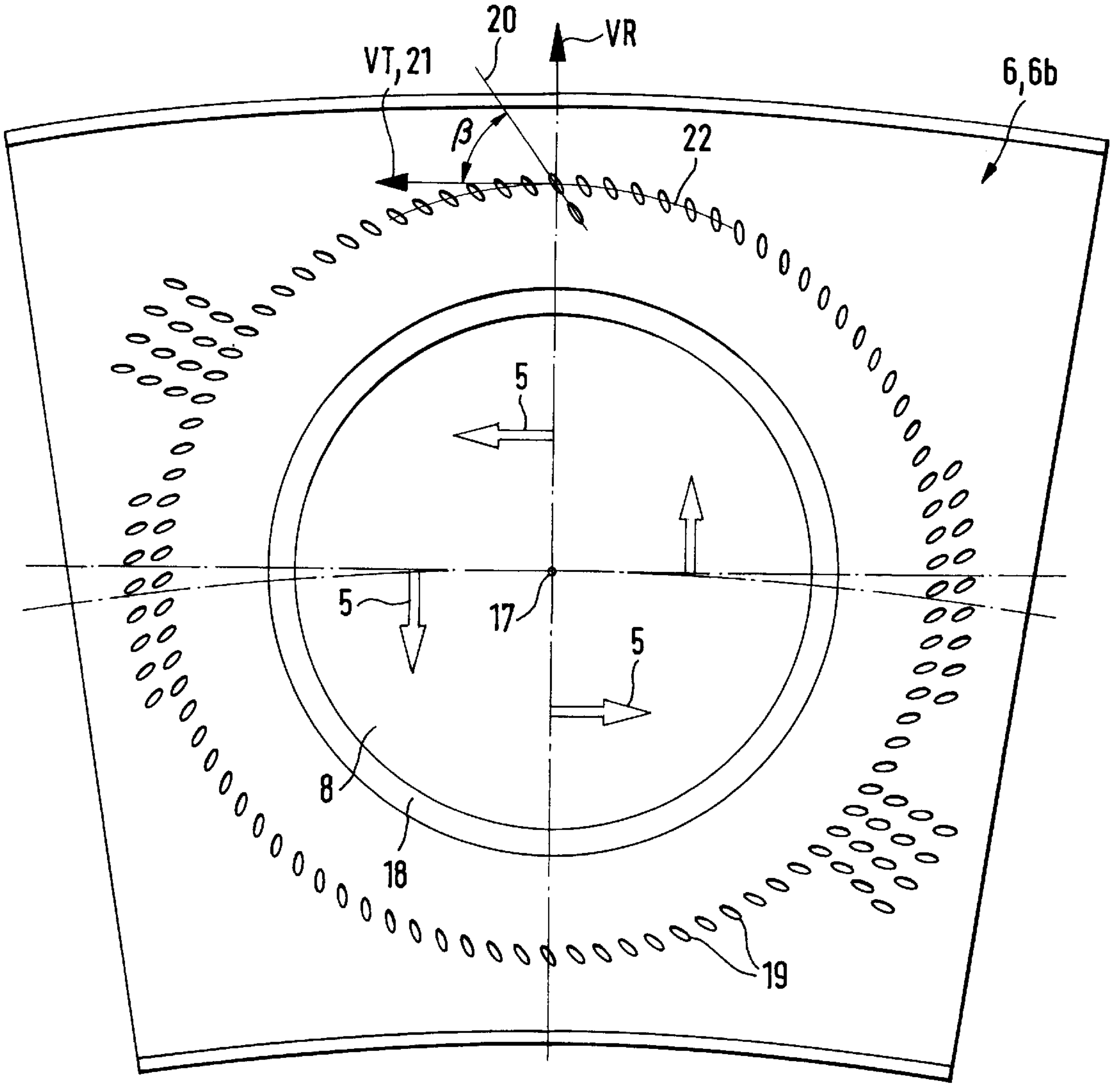
FIG. 4 is a top view of the hot surface facing the combustion chamber.

Reference number 1 indicates the annular combustion chamber of a gas turbine (gas turbine engine) which, on the head-end side, has a dome-type end wall 2 and then a front panel 3 which acts as a supporting wall. To this extent, this annular combustion chamber corresponds to the known state of the art. Also in a known manner, several burners 4 project in a circularly arranged manner into the annular combustion chamber 1, by way of which burners 4 fuel as well as combustion air is charged in a swirled manner into the combustion chamber 1. The direction of the swirl of the combustion air charged by way of the burner 4 is illustrated by arrows 5 in FIGS. 3, 4.

Figure 1:
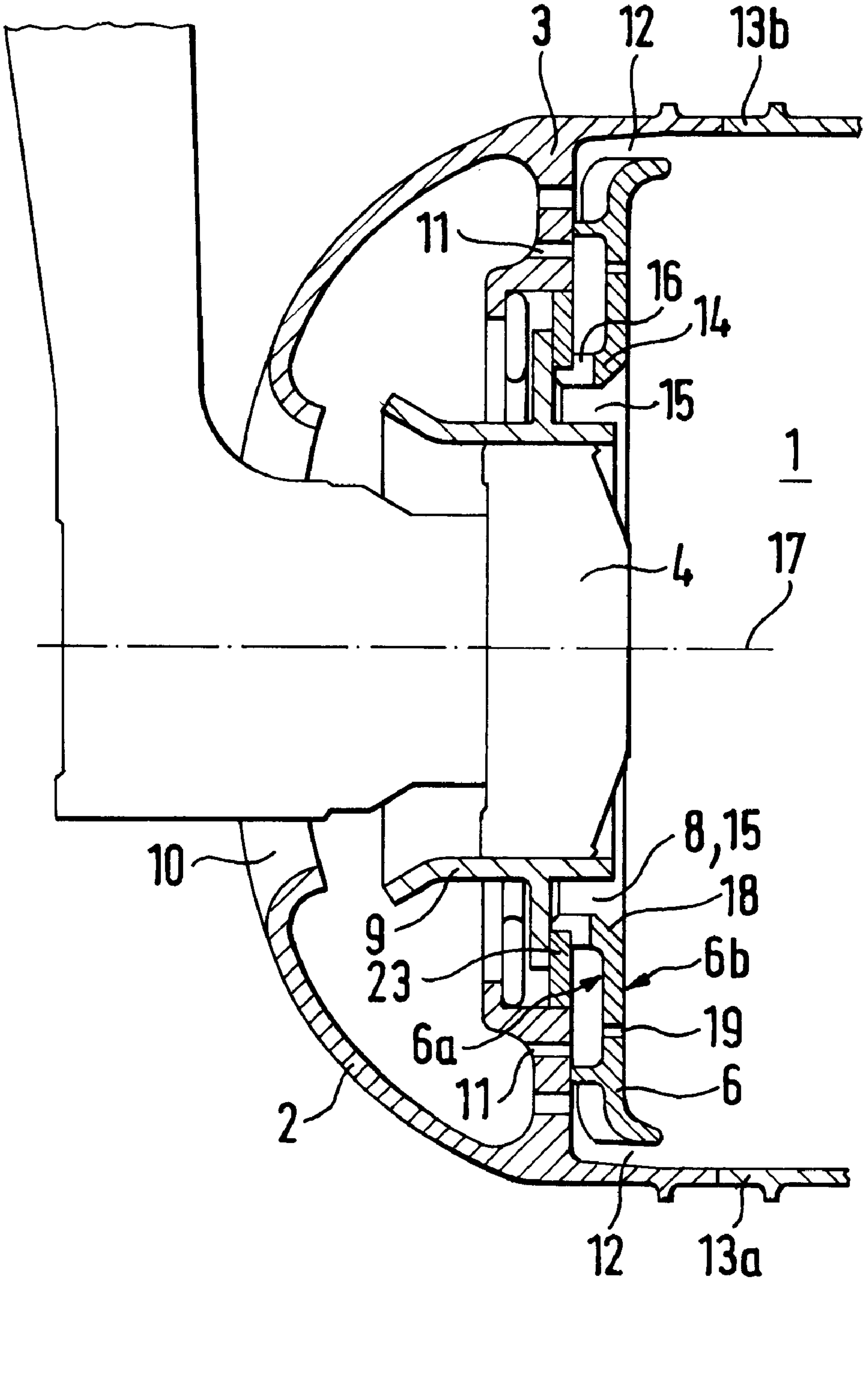
FIG. 1 is a partial sectional view of a head-end of an annular combustion chamber of a gas turbine according to the invention.
Figure 2:
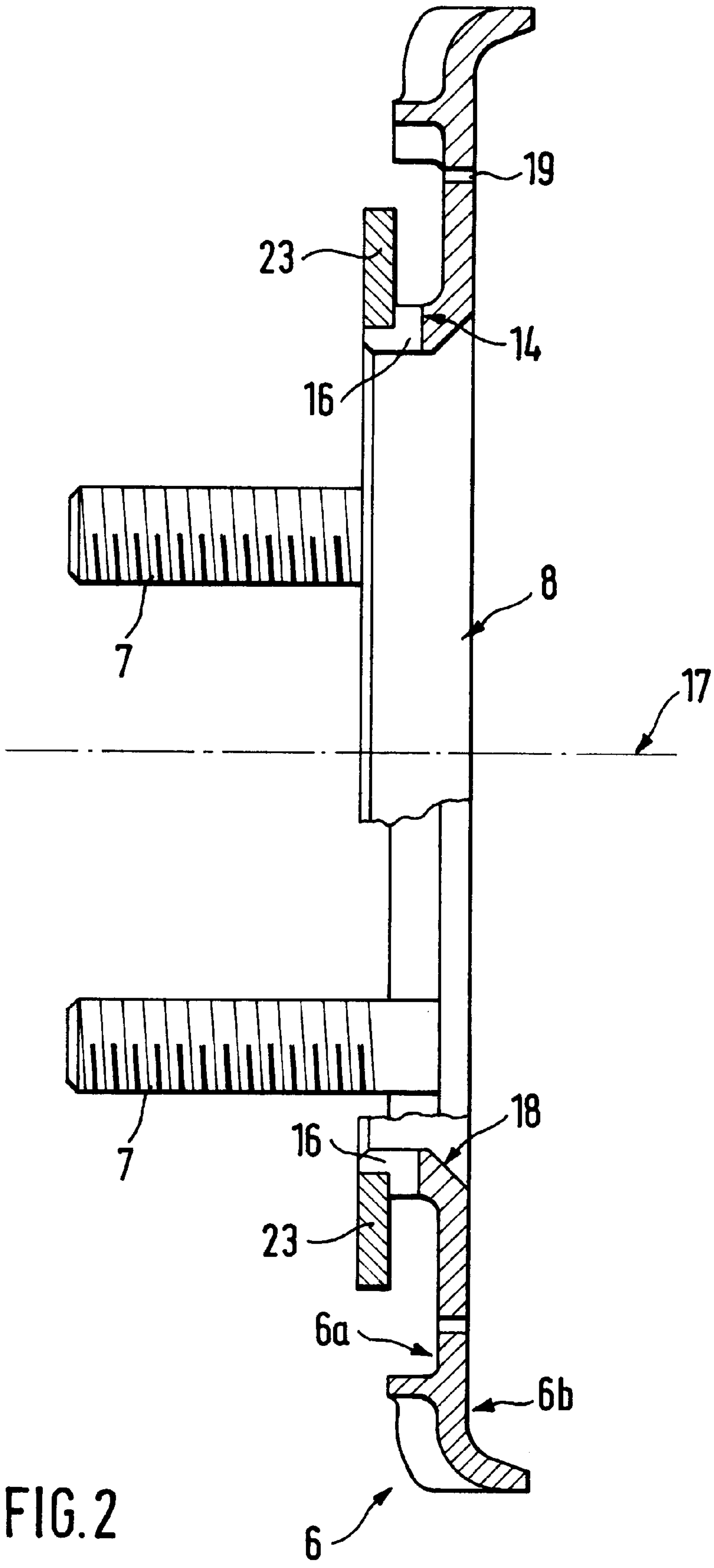
FIG. 2 is a sectional view of the upper half of a heat shield.

Between the front panel 3 as well as the actual combustion chamber 1, a heat shield 6 is provided. The heat shield 6 protects the so-called combustion-chamber dome, that is, the front panel 3, as well as the end wall 2, from the hot burner gases and from an unacceptably high radiation effect. This heat shield 6 is fastened by means of bolts 7 (compare FIG. 2) on the front panel 3 and has a through-hole 8 for the burner 4. In this case, the burner 4 is surrounded by a sealing part 9 which ensures, in particular, that a large portion of the combustion air supplied by the breakthrough 10 in the end wall 2 flows into the combustion chamber 1 by way of the burner 4.

A portion of the air flow supplied by way of the breakthrough 10 can reach the rearward side **6*a* of the heat shield 6 past the sealing part 9 by way of a row of bores 11 in the front panel 3 and thus cool the heat shield 6. By way of gaps 12 between the edges of the heat shield 6 as well as the interior combustion chamber wall 13*a* or the exterior combustion chamber wall 13*b*, a portion of the air flow acting upon the rearward side 6*a* of the heat shield 6 can arrive in the combustion chamber 1**.

At the edge of the through-hole 8, the heat shield 6 has a surrounding web 14 which projects from its rearward side **6*a* toward the rear, that is, in the opposite direction of the combustion chamber 1. In this case, the individual dimensions are selected such that a ring-shaped channel 15 is formed between the web 14 and the sealing part 9. Cooling air can flow into this ring-shaped channel 15 from the rearward side 6*a* of the heat shield 6 through air passage openings 16. Several air passage openings 16 are provided in the web 14. Since the free end of the surrounding web 14 rests against a clamped-in ring 23 which fixes the sealing part 9, cooling air can arrive in the ring-shaped channel 15 also only through these air passage openings 16**.

The air flow flowing into the ring-shaped channel 15 finally arrives in the combustion chamber 1, but on its path leading there must already intensively cool the particularly highly stressed areas of the heat shield 6. For this purpose, this air flow emerging from the ring-shaped channel 15 into the combustion chamber 1 must also be deposited as a cooling air film on the hot surface **6*b* of the heat shield 6 facing the combustion chamber 1, specifically in the edge area of the through-hole 8. In order to achieve this effect, a swirl is imposed on the air flow in the ring-shaped channel 15 which has the same direction as the swirl of the combustion air supplied by way of the burner 8. The cooling air emerging from the ring-shaped channel 15 must therefore form a swirl having the same direction as the arrows 5 which represent the swirl of the combustion air supplied by way of the burner 4. The swirl axes of these two air swirls are situated essentially perpendicularly with respect to the plane or the surface 6*b* of the heat shield 6**.

In order to impose the desired swirl on the cooling air flow emerging from the ring-shaped channel 15 into the combustion chamber 1, the air passage openings 15 are not directed to the center of the through-hole 8 but—as illustrated in FIG.

3—are inclined at an angle a with respect to the direction pointing into the center 17 of the through-hole 8.

The transition area between the web 14 and the hot surface 6*b* of the heat shield 6 is constructed as a chamfer 18 but may also have a rounded design. This measure makes it possible for the cooling air flow flowing in by way of the ring-shaped channel 15 to place itself, while maintaining its flow direction, as a cooling air film on the surface 6*b* of the heat shield 6. This placing of the cooling air flow as a cooling air film is particularly promoted by the fact that the swirl directions of the air flow guided by way of the ring-shaped channel 15 as well as of the combustion air flow entering by way of the burner 4 into the combustion chamber 1 coincide with each other.

In order to be able to also optimally cool the areas of the heat shield 6 which, viewed in the radial direction, are situated farther outside, the heat shield 6 is also provided with effusion holes 19 which lead from the rearward side 6*a* to the hot surface side 6*b* and thus permit the passage of cooling air through the heat shield 6. Also, this cooling air passing through the effusion holes 19 deposits itself as a cooling air film on the surface 6*b*. In order to achieve this effect, the center axes of the effusion holes 19 are inclined twice. The first angle of inclination is situated between the center axis of the effusion holes 19 and a perpendicular line onto the surface 6*b* of the heat shield 6. This means that the center axes of the effusion holes 19 are inclined with respect to the surface 6*b* so that the air flow emerging from an effusion hole 19 sweeps at least partially over the surface 6*b*. Another angle of inclination $\beta$ occurs in a perpendicular projection onto the surface 6*b*, in which case in this projection, the center axis 20 of each effusion hole is inclined with respect to the tangent 21 on a reference circle placed about the center 17 of the through-hole 8 through the respective effusion hole 19. By means of this described design of the effusion holes 19, which is illustrated particularly in FIG. 4, the cooling air film generated by these effusion holes 19 forms a swirl which has a velocity component VR which is directed radially toward the outside with respect to the center 17, as well as a velocity component VT which extends tangentially with respect to the reference circle 22. In this case, the angle of inclination $\beta$ is selected such that the tangential component VT has the same direction as the swirl of the combustion air supplied by way of the burner 4 and shown by the arrows 5. This same direction of the swirls ensures that a cooling air film can form which rests optimally against the surface 6*b*.

The best results are achieved if the amount of the radial velocity component VR is larger than that of the tangential component VT. However, this detail as well as other details particularly of the constructive type can also be designed so as to deviate from the illustrated embodiment without leaving the content of the claims.

What is claimed is:

1. A heat shield for a combustion chamber having a through-hole for a burner, wherein a ring-shaped channel is formed between the heat shield and the burner, and further wherein a rearward side of the heat shield facing away from the combustion chamber is acted upon by cooling air and has a web extending around on an edge of the through-hole, wherein said web includes a plurality of air passage holes inclined at an angle ($\alpha$) with respect to a direction pointing into a center of the through-hole such that an air flow entering through the air passage holes into the ring-shaped channel arranged between the heat shield and the burner and arriving from said channel into the combustion chamber forms a swirl having a swirl direction which is the same as a further swirl formed by combustion air supplied via the burner, said further swirl having a swirl axis arranged perpendicular to a forward surface of the heat shield.

2. The heat shield according to claim 1, wherein said ring-shaped channel is bounded by the web of the heat shield as well as by a sealing part which surrounds the burner.

3. The heat shield according to claim 1, wherein a transition area between the web and the forward surface facing the combustion chamber has one of a chamfer and rounded construction.

4. The heat shield according to claim 2, wherein a transition area between the web and the forward surface facing the combustion chamber has one of a chamfer and rounded construction.

5. The heat shield according to claim 1, further comprising a plurality of effusion holes in the forward surface facing the combustion chamber through which cooling air passes from the rearward side in order to deposit a cooling air film on the forward surface;

wherein center axes of said effusion holes are inclined relative to a perpendicular line onto the forward surface of the heat shield and have a perpendicular projection onto the forward surface which is inclined with respect to a respective tangent on a reference circle placed around a center of the through-hole through the respective effusion hole such that said cooling air flow forms a swirl having a velocity component (VR) directed radially outward with respect to the center as well as a velocity component (VT) extending tangentially with respect to the reference circle, said direction of the tangential velocity component (VT) coinciding with the further swirl of the combustion air supplied via the burner.

6. The heat shield according to claim 2, further comprising a plurality of effusion holes in the forward surface facing the combustion chamber through which cooling air passes from the rearward side in order to deposit a cooling air film on the forward surface;

wherein center axes of said effusion holes are inclined relative to a perpendicular line onto the forward surface of the heat shield and have a perpendicular projection onto the forward surface which is inclined with respect to a respective tangent on a reference circle placed around a center of the through-hole through the respective effusion hole such that said cooling air flow forms a swirl having a velocity component (VR) directed radially outward with respect to the center as well as a velocity component (VT) extending tangentially with respect to the reference circle, said direction of the tangential velocity component (VT) coinciding with the further swirl of the combustion air supplied via the burner.

7. The heat shield according to claim 3, further comprising a plurality of effusion holes in the forward surface facing the combustion chamber through which cooling air passes from the rearward side in order to deposit a cooling air film on the forward surface;

wherein center axes of said effusion holes are inclined relative to a perpendicular line onto the forward surface of the heat shield and have a perpendicular projection onto the forward surface which is inclined with respect to a respective tangent on a reference circle placed around a center of the through-hole through the respective effusion hole such that said cooling air flow forms a swirl having a velocity component (VR) directed radially outward with respect to the center as well as a velocity component (VT) extending tangentially with respect to the reference circle, said direction of the tangential velocity component (VT) coinciding with the further swirl of the combustion air supplied via the burner.

8. The heat shield according to claim 5, wherein an amount of the radial velocity component (VR) is larger than that of the tangential component (VT).

9. The heat shield according to claim 1, further comprising bolts which screw the heat shield to a front panel on which is mounted the sealing part.

10. A heat shield for a combustion chamber having a through-hole for a burner, wherein a ring-shaped channel is formed between the heat shield and the burner and further wherein a rearward side of the heat shield facing away from the combustion chamber is acted upon by cooling air and has a web extending around on an edge of the through-hole, the heat shield further comprising a swirler arranged at an upstream end of said web, such that an air flow entering through the swirler into the ring-shaped channel and arriving from said channel into the combustion chamber forms a swirl having a swirl direction which is the same as a further swirl formed by combustion air supplied via the burner, said further swirl having a swirl axis arranged perpendicular to a forward surface of the heat shield.

11. The heat shield according to claim 10, wherein the swirler comprises a plurality of air-passage slots, the air flow entering through the plurality of air-passage slots into the ring-shaped channel.

12. The heat shield according to claim 11, wherein the plurality of air passage slots are inclined at an angle ($\alpha$) with respect to a direction pointing into a center of the through-hole.

* * * * *